W. A. McMAHON.
INCUBATOR HEATER.
APPLICATION FILED JUNE 19, 1909.
961,520.
Patented June 14, 1910.
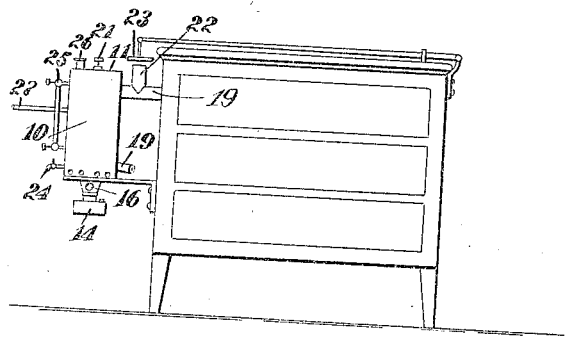
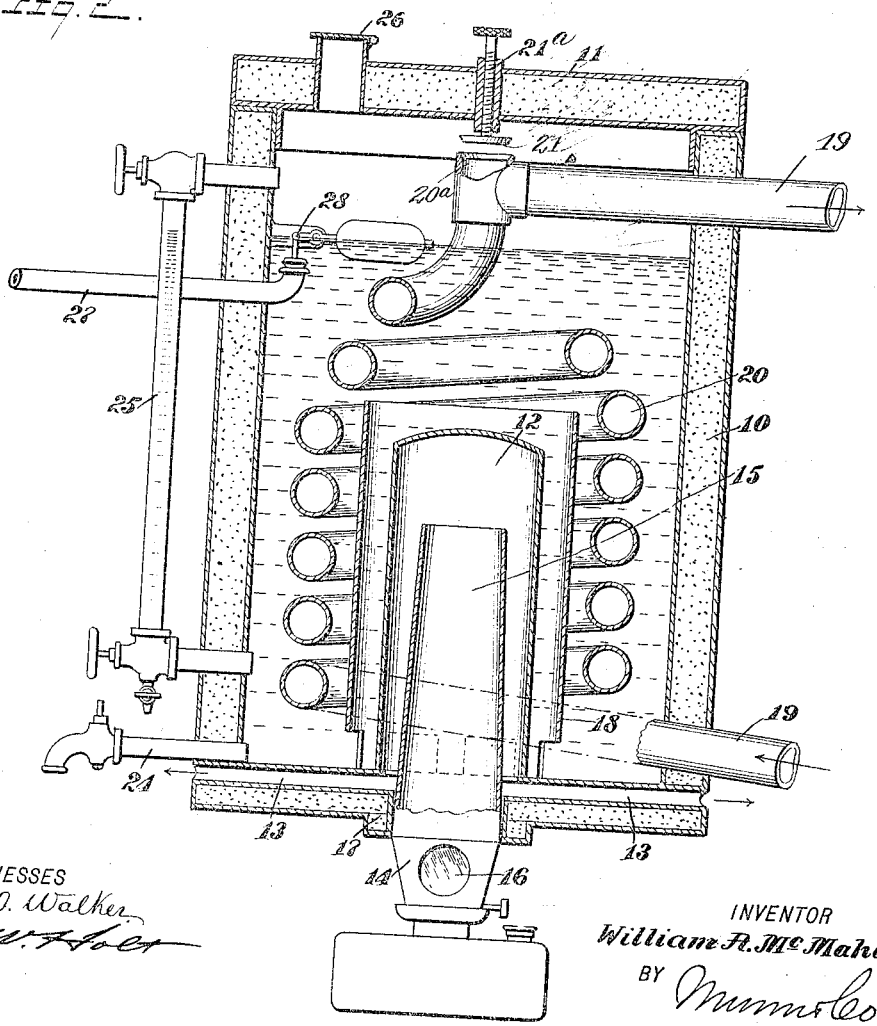
WITNESSES
H. J. Walker
W. W. Holt
INVENTOR
William A. McMahon
BY Munn & Co
ATTORNEYS

UNITED STATES PATENT OFFICE.

WILLIAM AUGUSTUS McMAHON, OF PHILADELPHIA, PENNSYLVANIA.

INCUBATOR-HEATER.

961,520.

Specification of Letters Patent.  Patented June 14, 1910.

Application filed June 19, 1909. Serial No. 503,104.

*To all whom it may concern:*

Be it known that I, WILLIAM AUGUSTUS MCMAHON, a citizen of the United States, and a resident of Philadelphia, in the county of Philadelphia and State of Pennsylvania, have invented a new and Improved Incubator-Heater, of which the following is a full, clear, and exact description.

The invention contemplates an incubator heater by which pure air only will be delivered to the incubator box or hatching compartment, the air at all times containing the requisite moisture irrespective of outside atmospheric conditions.

To this end the heater in general consists of a water tank, an air duct or pipe, a lamp or burner, a hood and a hot water flue, the tank being preferably constructed with insulated walls to confine the heat, the air duct leading from the outside of the tank near the bottom thereof, and discharging at a point near the top and provided with a valve above the normal water level in the tank for the admission of moisture, the hot water flue surrounded by and spaced from the hood and surrounded by the air duct, and the hood surrounding the chimney of the lamp and discharging the products of combustion at the bottom through suitable ducts in the tank.

Reference is to be had to the accompanying drawings forming a part of this specification, in which similar characters of reference indicate corresponding parts in both the views.

Figure 1 is a side elevation of an incubator having my improved heater applied thereto; and Fig. 2 is a central vertical section through the heater on an enlarged scale.

In the construction of the heater, a water tank 10 is provided with metal lined and jacketed walls having an intermediate filling of insulating material, the tank being ordinarily in the form of an upright cylinder with a close-fitting removable cover 11, and a central opening in the bottom which is covered and isolated from the water space by an upwardly-extending imperforate hood 12. Extending radially through the bottom of the tank from the central opening, and arranged adjacent to the inner lining, are outlets or ducts 13 for the discharge of the fumes and other products of combustion from a lamp 14, the lamp having a chimney 15 extending through the opening in the bottom of the tank to a point near the top of the hood 12. The chimney is preferably of tapering form having an opening 16, covered with isinglass or the like, through which the flame of the burner may be inspected.

A hot water flue 18 surrounds and is spaced from the hood 12 and has openings in the sides adjacent to the bottom of the tank, and is open at its upper end. An air duct or pipe 19 leads into the tank at a point near the bottom and is provided with a coil 20 in its length, surrounding and spaced from the flue, the coil extending above and over the upper end of the flue, at which point the duct passes to the vertical center of the tank, and above the normal water level is provided with a valve-controlled opening 20ª in the top for the admission of the vapor, the stem 21ª of the valve 21 being threaded into a central nut carried by the cover. From the vapor admission opening, the air duct passes to the outside of the tank to the incubator box, and at a point of its length is provided with an upwardly-extending discharge pipe 22 (see Fig. 1) automatically controlled by a damper regulator 23. The water tank is also provided with such appurtenances as a drain cock 24, a water gage 25, a combined relief valve and filling plug 26, and a water level regulator, the relief valve and filling plug being preferably formed as a part of the removable cover and consisting of an upwardly-extending nipple having a cap over the top, hinged to swing outwardly. The water level regulator comprises a water supply pipe 27 leading to the tank and a float-controlled valve 28 seating over the inner end of the pipe.

In the operation of the heater, the air passes from the outer atmosphere through the air pipe or duct 19, and in flowing through the coil is heated by the surrounding water before passing to the incubator box, the water as it is heated around the hood being projected against the exit end of the coil by the flue 18, the water in its circulation constantly flowing in the bottom openings of the jacket and discharging at the top. The vapor as it rises from the surface of the water in the tank passes into the valve opening in a quantity which may be reduced or increased by the adjustment of the valve 21, the proper quantity of moisture for the air being easily determined by inspecting the eggs in the incubator box, or any other suitable manner. Should the water in the tank become too highly heated, the vapor or steam will raise the relief valve and escape. The products of combustion from the lamp or burner after passing through the chimney and the hood escape through the outlets or ducts 13. The filling of the tank may be performed either by removing the cover or through the relief valve and filling plug 26, or through the pipe 27.

Having thus described my invention, I claim as new and desire to secure by Letters Patent:

1. The combination in an incubator heater, of a water tank having an approximately central hood extending upwardly from the bottom thereof, with the top of the hood arranged below the normal water level in the tank, a lamp having a chimney extending through the bottom of the tank into the hood, a hot-air supply pipe for the incubator passing from the outer air through the lower portion of the tank to the upper portion thereof, and a hot water flue to direct the heated water around the hood to the upper portion of the hot-air pipe, arranged between said pipe and hood and open at the bottom and top.

2. The combination in an incubator heater, of a water tank, a burner for heating the water in the tank, and a hot air supply pipe leading to the incubator through the water tank, having a coil in its length below the normal water level and provided with a valve-controlled vapor opening within the tank above said level.

3. The combination in an incubator heater, of a water tank having an opening in the bottom thereof, a hood arranged over said opening, the heater extending through said opening into the hood, a hot-air supply pipe leading to the incubator through the tank from the bottom thereof upwardly and provided with a coil in its length surrounding the hood, and a flue for directing the water heated around the hood against the upper portion of the coil, arranged between and spaced from the coil and hood and open at the bottom and top.

4. The combination in an incubator heater, of a water tank, means for heating the water in the tank, a hot air supply pipe leading to the incubator through the tank and heated by the water in the tank, said supply pipe having a vapor inlet opening therein communicating with the tank and arranged above the normal water level in the tank, and a manually-operated valve controlling the said inlet opening.

In testimony whereof I have signed my name to this specification in the presence of two subscribing witnesses.

WILLIAM AUGUSTUS McMAHON.

Witnesses:
WILSON H. EBERL,
HARRY APPLIN